Aug. 9, 1932.   E. C. PETERS ET AL   1,870,380
NUT
Filed April 30, 1931
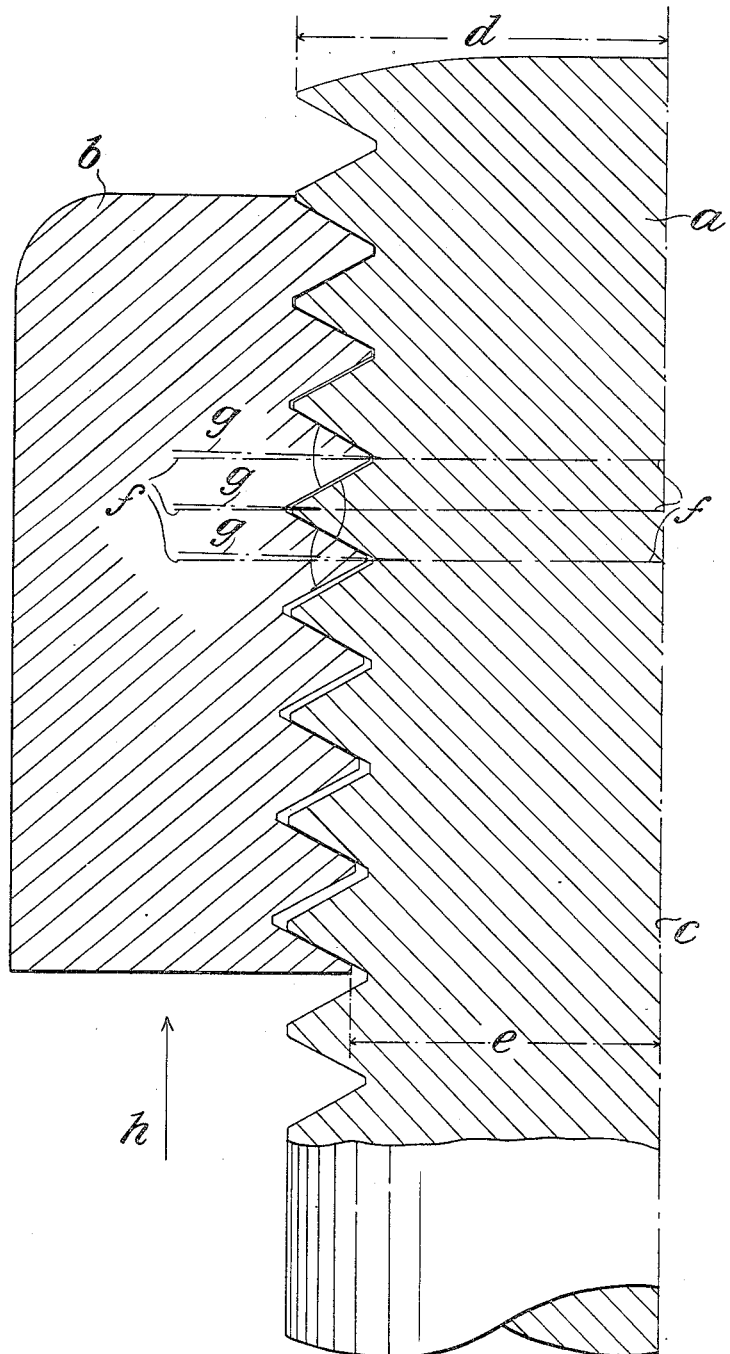
INVENTORS
EDWARD CORNELIUS PETERS
DICK CLAY PETERS
BY: Ruege & Boyce
ATTORNEYS Patented Aug. 9, 1932

1,870,380

UNITED STATES PATENT OFFICE

EDWARD CORNELIUS PETERS AND DICK CLAY PETERS, OF GRAFFHAM, PETWORTH, ENGLAND

NUT

Application filed April 30, 1931, Serial No. 533,994, and in Great Britain December 18, 1930.

This invention relates to nuts, and its object is to ensure that whilst the nut can be easily applied to its partner element, such as a screw, bolt or stud, the nut will remain securely held thereon.

For this purpose, the nut is formed throughout its axial length with a uniform screw thread of uniform depth, and the screw threaded aperture of the nut tapers, and, according to the invention, the outside diameter of the screw thread at the narrower end of the aperture is approximately equal to the outside diameter of a screw thread of a corresponding normal nut, whereas the inside diameter of the screw thread at the wider end of the aperture is approximately equal to the inside diameter of a screw thread of a corresponding normal nut.

Thus, in screwing a nut as above described on to a bolt having a normal screw thread of the same pitch as the screw thread of the nut, with the wider end of the aperture of the nut leading, as the nut advances on to the bolt the screw thread of the nut will progressively converge towards the axis of and grip the core of the bolt, but the nut will not crush the crest of the thread of the bolt, as the increased depth of the thread of the nut fully accommodates the thread of the bolt.

Preferably the screw thread of the nut is a V thread.

The screw thread of the nut is of uniform pitch throughout, and is equal in pitch to the pitch of the screw thread of the bolt.

The invention is illustrated on the accompanying drawing, which is a half longitudinal section on an enlarged scale of a nut mounted on a bolt. The clearance spaces between the screw threads of the bolt and nut are shown exaggerated in order to be clearly visible. In this drawing:—

$a$ is the bolt and $b$ is the nut, only one half of each on one side of the common axis $c$ being shown.

The screw thread of the bolt $a$ is a normal screw thread.

The screw threaded aperture in the nut $b$ is tapered and is formed throughout its axial length with a uniform screw thread of uniform depth. This is not novel.

However, according to the invention, whilst the outside diameter, of which $d$ is the radius, of the screw thread at the narrower end of the aperture of the nut is approximately equal in diameter to the outside diameter of a screw thread of a corresponding normal nut, the inside diameter, of which $e$ is the radius, of the screw thread of the nut at the wider end of the aperture is approximately equal in diameter to the inside diameter of a screw thread of a corresponding normal nut.

Therefore, not only is the screw threaded aperture of the nut tapered, but the screw thread thereof is deeper than the screw thread of a normal nut, by an amount equal to the decrease in radius due to the tapering of the aperture.

As indicated on the drawing the screw thread of the nut towards the narrower end of the aperture engages progressively deeper in the trough of the screw thread of the bolt, without however crushing the crest of the screw thread of the bolt.

The screw threads of the bolt and nut are V threads. However whilst each angle subtended by the screw thread of the bolt $a$ is, as usual, bisected by a line $f$ perpendicular to the cylindricity of the bolt and to the axis $c$, each angle subtended by the screw thread of the nut $b$ is bisected by a line $g$ perpendicular to the conicity of the aperture of the nut $b$. In other words, the screw thread of the nut $b$ is a uniform V thread and therefore is canted by the amount of the taper of the aperture. This has the result that, notwithstanding the increased depth and consequential lesser angle of the screw thread of the nut $b$ as compared with the screw thread of the bolt $a$, the screw thread of the nut $b$ makes contact with the screw thread of the bolt $a$ over a considerable area of surface, in the direction of thrust, indicated by the arrow $h$.

With a ¾ inch nut having a pitch of 10 threads to the inch and an axial length of ¾ inch, the aperture of the nut may decrease in diameter by .015 inch, with a corresponding increase in the depth of the screw thread of the nut, so that at the narrower end of the aperture the trough of the screw thread of the nut can still pass over the crest of the screw thread of a corresponding bolt having a normal screw thread.

In making the nut the usual manufacturer's tolerances may be adopted.

We claim:

1. A nut having a tapered aperture, and a screw thread of uniform depth formed in said tapered aperture, the outside diameter of said screw thread at the narrower end of said aperture being approximately equal to the outside diameter of a screw thread of a corresponding normal nut and the inside diameter of said screw thread at the wider end of said aperture being approximately equal to the inside diameter of a screw thread of a corresponding normal nut.

2. A nut having a tapered aperture, and a V screw thread of uniform depth formed in said tapered aperture and canted by the taper of said aperture, the outside diameter of said screw thread at the narrower end of said aperture being approximately equal to the outside diameter of a screw thread of a corresponding normal nut and the inside diameter of said screw thread at the wider end of said aperture being approximately equal to the inside diameter of a screw thread of a corresponding normal nut.

In testimony whereof we have signed our names to this specification.

EDWARD CORNELIUS PETERS.
DICK CLAY PETERS.